Patented June 7, 1927.

1,631,887

UNITED STATES PATENT OFFICE.

SWIGEL POSTERNAK, OF CHENE-BOUGERIES, NEAR GENEVA, SWITZERLAND, ASSIGNOR TO SOCIETY OF CHEMICAL INDUSTRY IN BASLE, OF BASEL, SWITZERLAND.

PHOSPHORUS CONTAINING NUCLEAR SUBSTANCE OF MILK CASEIN IN A CHEMICALLY-PURE FORM AND PROCESS OF MAKING THE SAME.

No Drawing. Application filed January 11, 1924, Serial No. 685,717, and in Switzerland January 25, 1923.

In specification (Serial No. 652,851 of July 20th, 1923,) there is described a process in which by digesting commercial casein with trypsin almost the whole phosphorus content thereof may be separated in form of a soluble calcium salt. The commercial casein, however, contains a considerable amount of mineral phosphates, rendering the preparation of the chemically pure compound a matter of great difficulty. On the one hand most substances which precipitate the former also precipitate the latter, and on the other hand the alkaline earth phosphates which are normally insoluble in water are readily soluble in the aqueous solutions of the alkaline earth salts of the organic compound.

It has now been found that the alkali metal carbonates possess the property of decomposing the heavy metal salts of the phosphorus containing compounds in question even in the cold converting them into soluble alkali metal salts, the metallic phosphates meanwhile remaining undissolved. The mineral phosphoric acid may be separated quantitatively from the organic compound by means of alkali metal carbonates in a very simple manner.

By the present invention the organic phosphorus-containing nuclear substance of milk casein may be obtained in a chemically pure form by digesting the casein by known methods in a weakly alkaline solution with pancreatic ferments, precipitating from the filtered digestion liquid by means of a heavy metal salt the heavy metal salt of the organic phosphorus compound, together with the heavy metal phosphate, treating the precipitate so obtained with a solution of an alkali metal carbonate to convert the heavy metal salt of the organic phosphorus compound into the alkali metal salt, separating the latter from the insoluble mineral phosphate, precipitating from the solution so obtained by addition of alcohol, the alkali-metal salt of the chemically pure organic phosphorus compound, dissolving the precipitate so obtained in water, precipitating the corresponding heavy metal salt by treatment with a suitable salt of a heavy metal, removing the heavy metal from the precipitate by means of hydrogen sulphide, filtering off the metallic sulphide, precipitating the free acid from the filtrate by addition of alcohol, and finally drying the precipitated product.

If required the solution of the alkali metal salt of the organic phosphorus compound obtained by decomposition of the heavy metal salt with an alkali metal carbonate may conveniently be subjected before further purification to a second digestion of a short duration with pancreatic ferments, whereupon the digestion liquid thus obtained, after having been filtered, is mixed with alcohol and the alkali metal salt of the organic phosphorus compound thus precipitated treated further as described in the preceding paragraph.

The free acid thus obtained is a white amorphous powder which contains 5.86 per cent of phosphorus. It is soluble in water to a clear solution, but is nearly insoluble in alcohol and insoluble in other organic solvents. The aqueous solution reacts neutrally to red Congo paper and is acid to methyl orange and litmus. The aqueous solution of the acid does not become turbid on the addition of magnesia mixture, that is to say, a mixture of ammonium chloride, ammonia, and magnesium chloride. When a molybdenum solution is added to the concentrated solution of the acid a pure white precipitate is produced, but no precipitate is obtained with a dilute solution. Copper acetate yields a clear blue precipitate, lead acetate and mercury salts a white precipitate, silver nitrate and ferric chloride give no precipitate with a solution of the free acid, but if the solution of the acid be first neutralized with caustic soda solution silver nitrate gives a white precipitate and iron salts a yellow precipitate. The new compound gives the biuret reaction, but does not react to Millon's, the xantho-proteic and Molisch's test. The alkali salts and the alkaline earth salts thereof are soluble in water, but the saturated iron salt and the heavy metal salts do not dissolve in water. The compound is fairly stable towards mineral acids in the cold; also towards ammonia and sodium bicarbonate at a temperature below 40° C. By treatment with caustic alkali or barium hydroxide, at ordinary temperature, half of the phosphoric acid is gradually split off, but at the boiling point all the phosphoric acid splits off almost spontaneously.

The invention is illustrated by the following example.

10 kilos of commercial milk casein are suspended in 80 litres of water previously warmed to 40° C. To this suspension there are added 620 grams of anhydrous sodium carbonate, 600 grams of sodium bicarbonate, 500 grams of finely subdivided pancreas, or 25 grams of trypsin, and 200 cc. of toluene. The mixture is left to stand first for two days at 40° C., with continuous stirring, and then for another 24 hours in the cold. After filtering sugar of lead and an aqueous solution of basic lead acetate are added to the solution until no further precipitate is formed. The lead precipitate, which contains all the phosphorous compounds originally present in the solution, is filtered, thoroughly washed with water, and pressed.

In order to remove the lead from the organic phosphorus compounds and to separate them from the lead phosphate, the lead precipitate is finely triturated with some water, a sodium carbonate solution of 20 per cent strength being added, while stirring, until the liquid is slightly alkaline to phenolphthalein. Generally about 2½ litres of the sodium carbonate solution are necessary. The solution thus formed is then sharply separated from the undissolved lead carbonate and lead phosphate and may conveniently be subjected to a second digestion with trypsin by addition of 100 grams of sodium bicarbonate and 5 grams of trypsin. After 24 hours the solution is ready for further treatment. To the filtered solution, the volume of which has been made up to 6 litres, there are added 10 litres of alcohol of 95 per cent strength whereupon the sodium salt of the pure phosphorus compound separates, as an oil, and is left to settle. The upper alcoholic layer is siphoned off, the oil is dissolved in water, and precipitated by means of sugar of lead. The lead salt is then filtered, washed, and the lead precipitated by means of hydrogen sulphide. After filtering off the lead sulphide the acid solution is then freed from hydrogen sulphide by an air current, concentrated in a vacuum at low temperature, and precipitated with 4 volumes of strong alcohol. Finally the snow-white precipitate so obtained is filtered, washed with alcohol, dried in a vacuum at low temperature, and pulverized. It forms the pure phosphorus containing nucleus of the casein.

It may be remarked that, without altering the result in any way, the precipitant added to the solution of the oil may be copper acetate or a mercury salt instead of sugar of lead. Further, ammonium carbonate or potassium carbonate may be employed in the place of sodium carbonate.

By neutralization of the free acid with alkalies or alkaline earths and subsequent drying in a vacuum—if necessary after precipitation with alcohol—there are obtained the alkali metal salt or alkaline earth metal salt of the compound. For the production of the sodium salt the aforesaid oil may be directly dried in a vacuum. By acting on the sodium salt with a soluble iron salt the iron salt of the organic phosphorus compound is produced.

What I claim is:—

1. Process for the manufacture of the phosphorus containing organic nuclear substance of milk casein in a chemically pure form, consisting in digesting milk casein, according to known methods, in weakly alkaline solution with pancreatic ferments, filtering the digestion liquid and precipitating the filtrate with a salt of a heavy metal, treating the precipitate of the heavy metal salt with an alkali metal carbonate solution, thereby eliminating the heavy metal from the organic phosphorus compound and separating this latter from mineral phosphates, filtering and adding alcohol to the filtrate, dissolving in water the alkali metal salt of the chemically pure phosphorus compound thus precipitated, adding a heavy metal salt to the solution, removing the heavy metal from the precipitate thus formed with a compound the kation of which is hydrogen and the anion of which yields with the heavy metal an insoluble salt, separating the latter, precipitating the solution of the free acid thus obtained with alcohol, and finally drying the phosphorus compound thus produced.

2. Process for the manufacture of the phosphorus containing organic nuclear substance of milk casein in a chemically pure form, consisting in digesting milk casein, according to known methods, in weakly alkaline solution with pancreatic ferments, filtering the digestion liquid and precipitating the filtrate with a salt of a heavy metal, treating the precipitate of the heavy meal salt with an alkali metal carbonate solution, thereby eliminating the heavy metal from the organic phosphorus compound and separating this latter from mineral phosphates, subjecting the solution obtained by decomposition of the heavy metal of the organic phosphorus compound with alkali metal carbonate to a second digestion with pancreatic ferments for a short time, filtering the digestion liquid thus obtained and adding alcohol to the filtrate, dissolving in water the alkali metal salt of the chemically pure phosphorus compound thus precipitated, adding a heavy metal salt to the solution, removing the heavy metal from the precipitate thus formed with a compound the kation of which is hydrogen and the anion of which yields with the heavy metal an insoluble salt, separating the latter, precipitating the solution of the free acid thus obtained with alcohol, and finally drying the phosphorus compound thus produced.

3. Process for the manufacture of the phosphorus containing organic nuclear substance of milk casein in a chemically pure form, consisting in digesting milk casein, according to known methods, in weakly alkaline solution with pancreatic ferments, filtering the digestion liquid and precipitating the filtrate with a salt of a heavy metal, treating the precipitate of the heavy metal salt with an alkali metal carbonate solution, thereby eliminating the heavy metal from the organic phosphorus compound and separating this latter from mineral phosphates, filtering and adding alcohol to the filtrate, dissolving in water the alkali metal salt of the chemically pure phosphorus compound thus precipitated, adding a heavy metal salt to the solution, removing the heavy metal from the precipitate thus formed with hydrogen sulfide, separating the insoluble sulfide of the heavy metal thus formed, precipitating the solution of the free acid thus obtained with alcohol, and finally drying the phosphorus compound thus produced.

4. Process for the manufacture of the phosphorus containing organic nuclear substance of milk casein in a chemically pure form, consisting in digesting milk casein, according to known methods, in weakly alkaline solution with pancreatic ferments, filtering the digestion liquid and precipitating the filtrate with a salt of a heavy metal, treating the precipitate of the heavy metal salt with an alkali metal carbonate solution, thereby eliminating the heavy metal from the organic phosphorus compound and separating this latter from mineral phosphates, subjecting the solution obtained by decomposition of the heavy metal of the organic phosphorus compound with alkali metal carbonate to a second digestion with pancreatic ferments for a short time, filtering the digestion liquid thus obtained and adding alcohol to the filtrate, dissolving in water the alkali metal salt of the chemically pure phosphorus compound thus precipitated, adding a heavy metal salt to the solution, removing the heavy metal from the precipitate thus formed with hydrogen sulfide, separating the insoluble sulfide of the heavy metal thus formed, precipitating the solution of the free acid thus obtained with alcohol, and finally drying the phosphorus compound thus produced.

5. In the process for the manufacture of the phosphorus containing organic nuclear substance of milk casein in a chemically pure form, the step of decomposing a heavy metal salt of the organic phosphorus compound obtained by the tryptic digestion of milk casein with a solution of alkali metal carbonate.

6. As a new product the phosphorus containing organic nuclear substance of milk casein, which constitutes in form of the free acid a white, amorphous powder containing 5.86 per cent of phosphorus, which is soluble in water, giving a clear solution, nearly insoluble in alcohol, and insoluble in other organic solvents, and which, when reacted upon with inorganic bases, forms salts partly soluble partly insoluble in water.

In witness whereof I have hereunto signed my name this 21st day of December, 1923.

SWIGEL POSTERNAK.